US012071801B2

(12) United States Patent
Park

(10) Patent No.: US 12,071,801 B2
(45) Date of Patent: Aug. 27, 2024

(54) REFRIGERATOR AND CONTROLLING METHOD THEREOF

(71) Applicant: Samsung Electronics Co., Ltd., Suwon-si (KR)

(72) Inventor: Kitae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 552 days.

(21) Appl. No.: 17/376,680

(22) Filed: Jul. 15, 2021

(65) Prior Publication Data

US 2022/0025690 A1 Jan. 27, 2022

(30) Foreign Application Priority Data

Jul. 24, 2020 (KR) ........................ 10-2020-0092413

(51) Int. Cl.
*E05F 15/611* (2015.01)
*E05F 15/79* (2015.01)
*F25D 23/02* (2006.01)

(52) U.S. Cl.
CPC ............ *E05F 15/611* (2015.01); *E05F 15/79* (2015.01); *F25D 23/028* (2013.01); *E05Y 2201/41* (2013.01); *E05Y 2201/422* (2013.01); *E05Y 2900/31* (2013.01); *F25D 2323/021* (2013.01)

(58) Field of Classification Search
CPC ........... E05Y 2201/41; E05Y 2201/422; E05Y 2900/31; F25D 2323/021; E05F 15/79
See application file for complete search history.

(56) References Cited

U.S. PATENT DOCUMENTS 6,581,778 B1 * 6/2003 Kato .................... B65G 69/186 55/DIG. 12
9,366,472 B2 6/2016 Seo et al.
10,197,326 B2 2/2019 Son et al.
11,339,602 B2 5/2022 Lee et al.
2003/0005639 A1 * 1/2003 Kowalczyk ........... E05F 15/603 49/340
2005/0176400 A1 * 8/2005 Mullet .................. E05F 15/668 455/403

(Continued)

FOREIGN PATENT DOCUMENTS

CN 109826925 A 5/2019
EP 3 537 079 A1 9/2019

(Continued)

OTHER PUBLICATIONS

International Search Report dated Oct. 26, 2021, issued in International Patent Application No. PCT/KR2021/009113.

(Continued)

*Primary Examiner* — Mong-Shune Chung
(74) *Attorney, Agent, or Firm* — Jefferson IP Law, LLP

(57) ABSTRACT

A refrigerator and a controlling method thereof are provided. The refrigerator includes a main body including first and second doors, a first motor for opening the first door and a second motor for opening the second door, and a processor configured to, based on a user command for opening the door being obtained, start driving the first motor to open the first door, and after a first time from the time when the first motor has started being driven, start driving the second motor to open the second door.

14 Claims, 8 Drawing Sheets

(56) References Cited

U.S. PATENT DOCUMENTS

| | | | | |
|---|---|---|---|---|
| 2010/0018240 | A1* | 1/2010 | Hecht | F25D 23/028 62/449 |
| 2017/0260794 | A1* | 9/2017 | Son | E05F 15/619 |
| 2019/0055770 | A1* | 2/2019 | Bars | E05F 15/71 |
| 2019/0162006 | A1* | 5/2019 | Lee | E05F 15/619 |
| 2019/0330909 | A1 | 10/2019 | Lee et al. | |
| 2020/0263918 | A1* | 8/2020 | Lee | E05F 17/004 |
| 2022/0213730 | A1 | 7/2022 | Lee et al. | |

FOREIGN PATENT DOCUMENTS

| | | | | |
|---|---|---|---|---|
| JP | 2005-214490 | A | | 8/2005 |
| JP | 3880821 | B2 | | 2/2007 |
| JP | 2008-256231 | A | | 10/2008 |
| JP | 2008256231 | A | * | 10/2008 |
| JP | 2014-214893 | A | | 11/2014 |
| KR | 10-2005-0077786 | A | | 8/2005 |
| KR | 10-0602218 | B1 | | 7/2006 |
| KR | 10-2009-0091455 | A | | 8/2009 |
| KR | 10-2010-0131182 | A | | 12/2010 |
| KR | 10-2014-0121187 | A | | 10/2014 |
| KR | 10-1447291 | B1 | | 10/2014 |
| KR | 10-1537377 | B1 | | 7/2015 |
| KR | 10-1618552 | B1 | | 5/2016 |
| KR | 10-2016-0090704 | A | | 8/2016 |
| KR | 10-1897356 | B1 | | 9/2018 |

OTHER PUBLICATIONS

Extended European Search Report dated Oct. 12, 2023, issued in European Patent Application No. 21846316.4.

* cited by examiner

REFRIGERATOR AND CONTROLLING METHOD THEREOF

CROSS-REFERENCE TO RELATED APPLICATION(S)

This application is based on and claims priority under 35 U.S.C. § 119(a) of a Korean patent application number 10-2020-0092413, filed on Jul. 24, 2020, in the Korean Intellectual Property Office, the disclosure of which is incorporated by reference herein in its entirety.

BACKGROUND

1. Field

The disclosure relates to a refrigerator and a controlling method thereof. More particularly, the disclosure relates to a refrigerator automatically opening and closing a plurality of doors and a controlling method thereof.

2. Description of Related Art

A refrigerator is an electronic apparatus (or home appliance) for storing edible and drinkable food refrigerated or frozen through a refrigeration cycle using a refrigerant. The refrigerator may also store medicine, alcoholic liquor, or cosmetics, in addition to the food.

In the related art, a user usually opened and closed a door of a refrigerator manually. However, the user frequently could not open the door of the refrigerator by himself/herself when the user was holding heavy plates on his/her hands, and accordingly, there was need for an automatic opening function of the door of the refrigerator. Therefore, there was increasing need for users regarding a technology related to a refrigerator with automatically opened and closed doors and need for research and development thereof.

Meanwhile, in order to open and close the door of the refrigerator automatically, it is necessary to provide a motor providing a power so that the doors rotate. In general, in order to open the door when the door is closed, a large power is necessary due to a difference in pressure between the inside and the outside of a refrigeration compartment, and accordingly, the motor needs to rotate rapidly.

In order to open a plurality of doors of the refrigerator, a plurality of motors need to be driven, and therefore, there was a problem that it is necessary to provide a device for supplying a high capacity of power to the plurality of motors.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problem and/or disadvantages and to provide at least the advantages described below. Accordingly, an aspect of the disclosure is to provide a refrigerator efficiently opening and closing doors by controlling an order and time that a plurality of doors are opened and closed, and a controlling method thereof.

Additional aspects will be set forth in part in the description which follows and, in part, will be apparent from the description, or may be learned by practice of the presented embodiments.

In accordance with an aspect of the disclosure, a refrigerator is provided. The refrigerator includes a main body including a first door and a second door, a first motor for opening the first door and a second motor for opening the second door, and a processor configured to, based on a user command for opening the door being obtained, start driving the first motor to open the first door, and after a first time from a time when the first motor has started being driven, start driving the second motor to open the second door.

The first time may be a time during which a magnitude of an inrush current applied to the first motor by starting the driving of the first motor becomes a value less than a threshold value.

The processor may be further configured to drive the first motor with an operating current with a magnitude smaller than the inrush current, until the first door is opened by a threshold angle after the first time.

The second door may be combined with a rotating bar.

The processor may be further configured to, based on a first threshold time elapsing from the time when operations of opening the first door and the second door are completed, start driving the second motor to close the second door, and start driving the first motor to close the first door, after a second time from the time when the second motor has started being driven.

The second time may be a time after a counter electromotive force is generated on the second motor by starting the driving of the second motor, and before the magnitude of the inrush current flowing to the second motor increases.

The processor may be further configured to, based on the first door and the second door being opened by a threshold angle, control revolutions per minute (RPM) of the first motor and the second motor so that opening operations of the first door and the second door are completed at the same time.

The processor may be further configured to control the RPM of the first motor and the second motor based on at least one of a weight of each of the first door and the second door and a time point when the door is opened by the threshold angle.

The processor may be further configured to, based on the second door not being closed due to the rotating bar after the first door is closed first, drive the first motor to open the first door, and after a second threshold time from the time when the first door is opened, drive the first motor and the second motor so that the second door is closed first and then the first door is closed.

In accordance with another aspect of the disclosure, a method for controlling a refrigerator including a main body including first and second doors, a first motor for opening the first door and a second motor for opening the second door is provided. The method includes based on a user command for opening the door being obtained, starting driving the first motor to open the first door, and after a first time from a time when the first motor has started being driven, starting driving the second motor to open the second door.

The first time may be a time during which a magnitude of an inrush current applied to the first motor by starting the driving of the first motor becomes a value less than a threshold value.

The starting driving the second motor may include driving the first motor with an operating current with a magnitude smaller than the inrush current, until the first door is opened by a threshold angle after the first time.

The second door may be combined with a rotating bar.

The control method may further include based on a first threshold time elapsing from the time when operations of opening the first door and the second door are completed, starting driving the second motor to close the second door, and starting driving the first motor to close the first door, after a second time from the time when the second motor has started being driven.

The second time may be a time after a counter electromotive force is generated on the second motor by starting the driving of the second motor, and before the magnitude of the inrush current flowing to the second motor increases.

The control method may further include, based on the first door and the second door being opened by a threshold angle, controlling RPM of the first motor and the second motor so that opening operations of the first door and the second door are completed at the same time.

The controlling RPM of the first motor and the second motor may include controlling the RPM of the first motor and the second motor based on at least one of a weight of each of the first door and the second door and a time point when the door is opened by the threshold angle.

The control method may further include based on the second door not being closed due to the rotating bar after the first door is closed first, driving the first motor to open the first door, and after a second threshold time from the time when the first door is opened, driving the first motor and the second motor so that the second door is closed first and then the first door is closed.

The solution of the disclosure is not limited to the above solutions and solutions not mentioned above may be clearly understood by those skilled in the art of the disclosure from this specification and accompanying drawings.

According to the various embodiments of the disclosure, the refrigerator may efficiently open and close the doors with minimum power supply in a limited space by suitably controlling the order and the time that the plurality of doors are opened and closed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
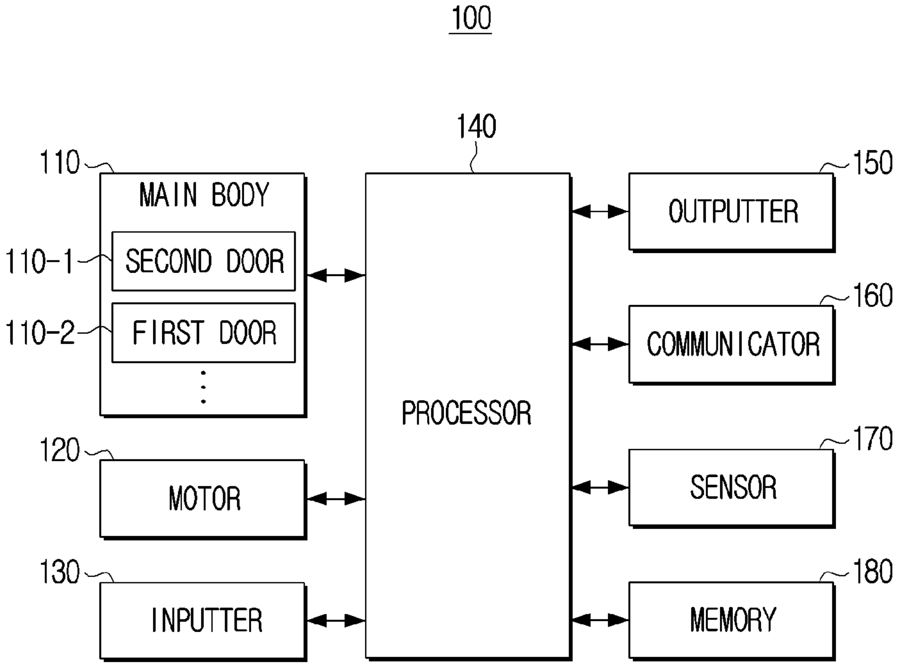
FIG. 1A is a block diagram specifically illustrating a configuration of a refrigerator according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "first," "second," or the like may be used for describing various elements but the elements may not be limited by the terms. The terms are used only to distinguish one element from another.

Unless otherwise defined specifically, a singular expression may encompass a plural expression. It is to be understood that the terms such as "comprise" or "consist of" are used herein to designate a presence of characteristic, number, operation, element, part, or a combination thereof, and not to preclude a presence or a possibility of adding one or more of other characteristics, numbers, operations, elements, parts or a combination thereof.

Hereinafter, with reference to the accompanying drawings, embodiments of the disclosure will be described in detail for those skilled in the art to easily practice the embodiments. But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

Figure 1B:
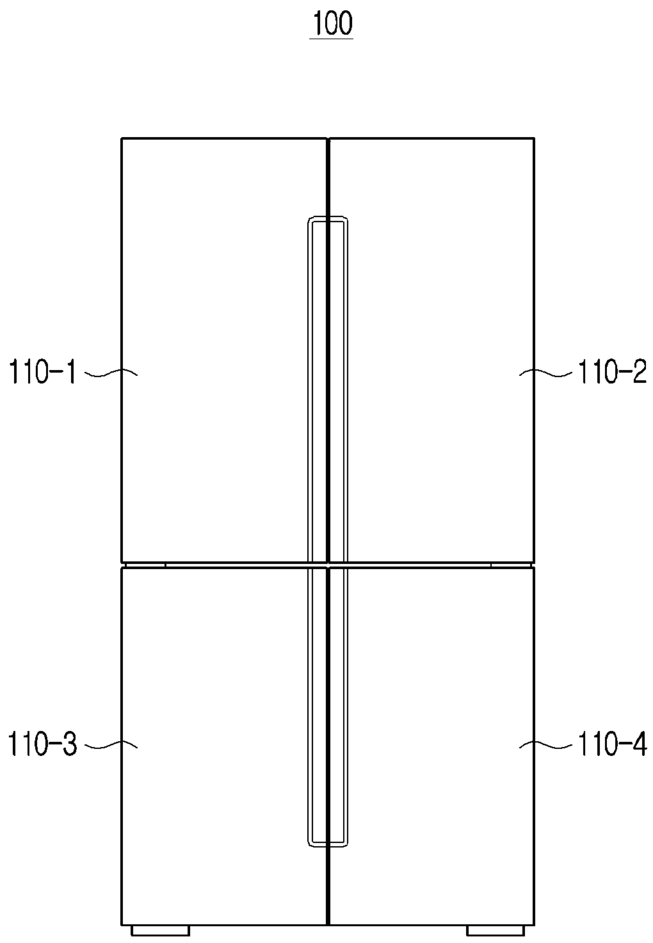
FIG. 1B is a front view of a refrigerator according to an embodiment of the disclosure.

FIGS. 1A and 1B are a block diagram for illustrating a configuration of a refrigerator and a front view of the refrigerator according to various embodiments of the disclosure, respectively.

Referring to FIG. 1A, a refrigerator 100 may include a main body 110, a motor 120, an inputter 130, a processor 140, an outputter 150, a communicator 160, a sensor 170, and a memory 180. However, the configuration illustrated in FIG. 1A is merely a diagram for implementing embodiments of the disclosure, and appropriate hardware and software configurations apparent to those skilled in the art may be further included in the refrigerator 100.

The main body 110 of the refrigerator 100 may include a storage compartment (not illustrated), a plurality of doors for opening and closing the storage compartment, and constituent elements for opening and closing the plurality of doors (e.g., gear, lever, and the like). The storage compartment may be divided into a refrigerator compartment storing food refrigerated at a temperature above zero degrees Celsius, and a freezer compartment storing various foods at a temperature below zero degrees Celsius. In addition, referring to FIG. 1A, the refrigerator may include a first door 110-2 and a second door 110-1. A cabinet or the like for storing various foods may be attached to each door.

Meanwhile, the number of doors included in the main body 110 is not limited, and referring to FIG. 1B, the first door 110-2 and the second door 110-1 may be disposed on an upper portion of the refrigerator 100, and a third door 110-3 and a fourth door 110-4 may be provided on a lower portion thereof. In addition, the positions and shapes of the plurality of doors may be variously set. According to the arrangement of the doors and storage compartments, the refrigerator 100 may be implemented as a French door type refrigerator, a side-by-side type refrigerator, and the like.

In addition, a rotating bar for preventing refrigerated air in the refrigerator from leaking through a gap between the doors may be attached to at least one door. An embodiment related to the rotating bar will be described in detail with reference to FIG. 1C. Meanwhile, the rotating bar may be variously expressed as a French heater, a refrigerated air screen, and the like.

The motor 120 is a constituent element performing a rotation operation and the like to provide an external force (e.g., rotational force and the like) to the main body so that the doors are opened or closed, and may be provided on each door. Specifically, the motor 120 may provide a rotational force to a gear combined with the main body. The gear may transfer the rotational force provided from the motor 120 to a lever of the door attached (or combined) to the main body 110, and the lever may apply the external force (e.g., rotational force) to the door based on the transferred rotational force, thereby opening or closing the door.

Meanwhile, the motor 120 may be provided on an upper region of each of the plurality of doors, but this is merely an embodiment, and the motor 120 may be provided at various positions such as a lower region or a side region of the door to open or close the door.

The inputter 130 may be a constituent element receiving a user command for opening or closing the door. The inputter 130 may include circuitry and may be configured as a separate hardware device. For example, the inputter 130 may be implemented as a microphone for obtaining a voice command of a user, a switch to be turned on by a contact of a user, a touch screen for obtaining a touch input of a user, a sensor for detecting a gesture of a user, a sensor for detecting that a body of a user or an object approaches, and the like, but there is no limitation thereto. Meanwhile, the user command may also be received via a user terminal device and this will be described later.

The inputter 130 may be provided inside of the refrigerator 100, but may be provided outside thereof and electrically connected to the refrigerator 100 or connected thereto via a wireless interface.

The processor 140 may be electrically connected to the memory 180 to control general operations and functions of the refrigerator 100.

The processor 140 may obtain a user command for opening the door by using at least one of the inputter 130, the communicator 160, and the sensor 170. In an embodiment, the processor 140 may obtain a voice command for opening the door via a microphone. The processor 140 may input the voice command obtained via the microphone to a dialogue system stored in the memory 180 to grasp the meaning of opening the door.

In another embodiment, the processor 140 may identify whether a body of a user or an object approaches within a threshold distance from the refrigerator 100 by using a proximity sensor. If it is identified that the body of the user or the object approaches within the threshold distance of the refrigerator, the processor 140 may identify that the user command for opening the door is obtained. At that time, the proximity sensor may be positioned at the center of the refrigerator, but there is no limitation thereto, and the proximity sensor may be positioned at various portions such as a side region, an upper region, a lower region, and the like of the refrigerator 100.

In still another embodiment, if a pre-registered user touch is input on a touch screen, the processor 140 may identify the input user touch as the user command for opening the door. In still another embodiment, if a physical interaction such as a touch or the like is detected by a pressure sensor, the processor 140 may identify the detected physical interaction as the user command for opening the door.

When the user command for opening the door is obtained, the processor 140 may start driving a first motor, in order to open the first door. The starting of the driving of the first motor by the processor 140 may imply that the processor 140 starts providing a power to the first motor so that the first motor performs a rotation operation to generate a rotational force.

When the power is started to be provided to the first motor by the control of the processor 140, a current may flow through a coil included in the first motor. In addition, a counter electromotive force may be generated on the first motor in an opposite direction of the initial current flowing through the coil included in the first motor. When the counter electromotive force is generated on the first motor and the rotation operation is started, an inrush current may be generated on the first motor. The inrush current may refer to a large capacity of current instantaneously flowing to the motor, when the power is applied to the motor, and may also be expressed as a surge current in an excessive state. The magnitude of the inrush current may rapidly increase during a certain period of time and then may be decreased and maintained as a magnitude of a rated current (or operating current).

Meanwhile, if the processor 140 starts the driving of the first motor and the second motor at the same time, the counter electromotive force and inrush current may be generated on each of the first motor and the second motor, at the same time. The amount of power necessary in order to overcome the counter electromotive force and a large value of inrush current generated on each motor at the same time, may be approximately two times the amount of power necessary in order to overcome the counter electromotive force and inrush current generated on one motor. Accordingly, in order to start driving the first motor and the second motor at the same time, the refrigerator 100 may need a power supplier with an extremely high capacity.

Accordingly, after a first time from the time when the first motor is started being driven, the processor 140 may start driving the second motor, in order to open the second door. The first time may be a time during which the magnitude of the inrush current applied to the first motor by starting driving the first motor becomes a value less than a threshold value. In addition, the threshold value may be a predetermined value or a measured value obtained by an experiment or the like, and may also be changed by the user.

In an embodiment, the processor 140 may identify the magnitude of the inrush current applied to the first motor by using a sensor or the like for detecting a magnitude of a current. If it is identified that the magnitude of the inrush current is less than the threshold value, the processor 140 may start driving the second motor.

Meanwhile, after the first time from the time when the first motor is started being driven, an operating current (or rated current) with a smaller magnitude than the inrush current may flow to the first motor. Specifically, the processor 140 may drive the first motor with the operating current until the first door is opened by a threshold angle. In other words, a time point when the second motor is started being driven may overlap with a time point when the rated current is flowing to the first motor. Accordingly, the refrigerator 100 may include a power device for overcoming the rated current of the first motor and the counter electromotive force and inrush current generated when driving the second motor. The capacity of the power device necessary for overcoming the rated current of the first motor and the counter electromotive force and inrush current generated when driving the second motor may be much smaller than the capacity of the power device necessary when driving the first motor and the second motor at the same time.

In another embodiment, the first time may be a time measured by an experiment or predefined time. Accordingly, when the first time elapses after driving the first motor, the processor 140 may start driving the second motor without identifying the magnitude of the current flowing to the first motor. The first time may also be changed by the user.

Figure 1C:
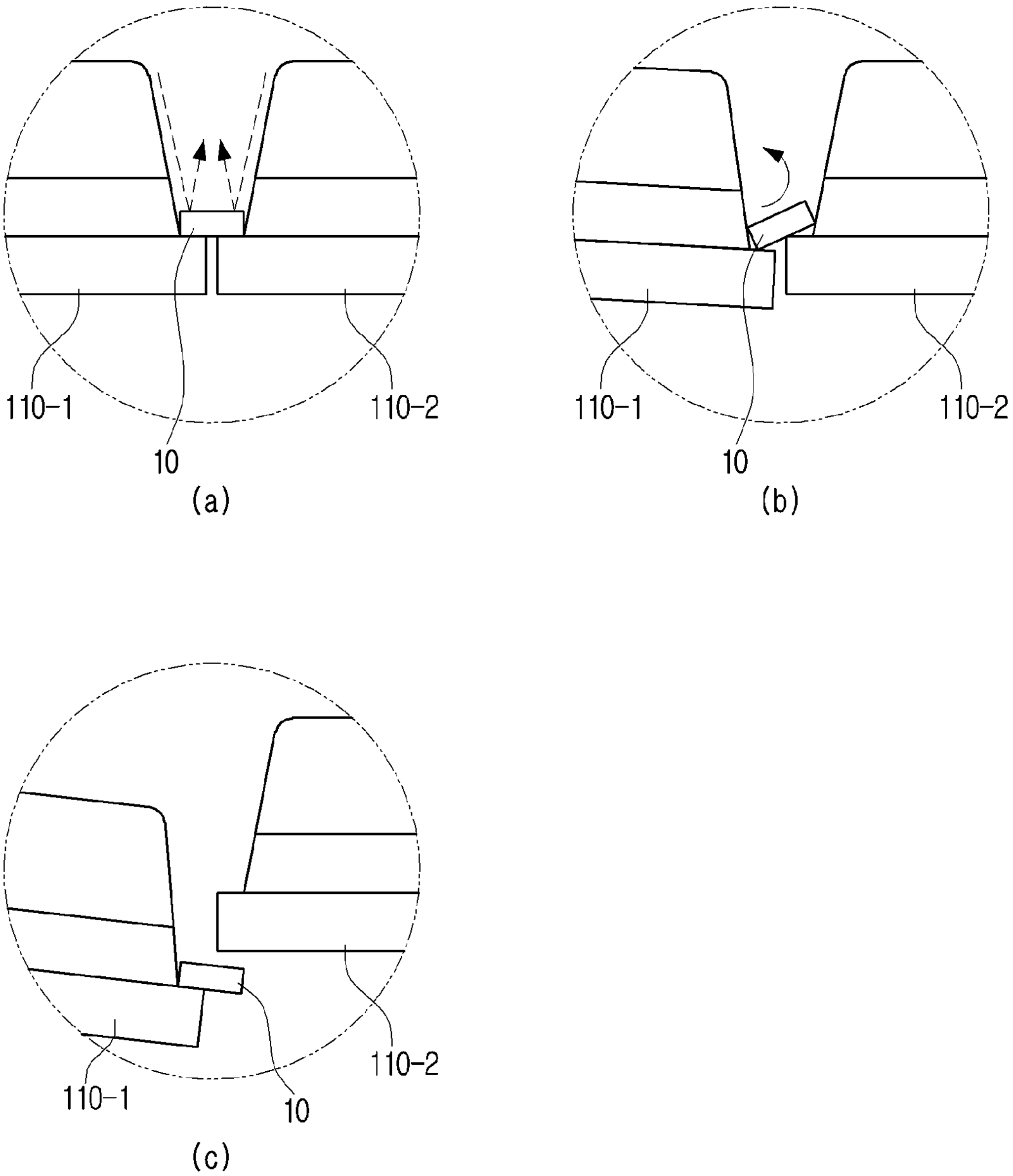
FIG. 1C is a diagram illustrating a configuration and an operation of a refrigerator according to an embodiment of the disclosure.

FIG. 1C is a diagram illustrating a configuration and an operation of a refrigerator according to an embodiment of the disclosure.

Meanwhile, a rotating bar (or French heater) may be attached (combined) to the second door 110-1. When the second door 110-1 is closed, the rotating bar may be spread in a horizontal direction of the second door 110-1 and positioned at the center of the refrigerator. Referring to the part (a) of FIG. 1C, when the second door 110-1 is closed, the rotating bar 10 may be spread in the horizontal direction of the second door 110-1. Accordingly, the rotating bar 10 may prevent the refrigerated air inside of the refrigerator 100 from leaking through a gap between the first door 110-2 and the second door 110-1.

Referring to (b) of FIG. 1C, when only the second door 110-1 is opened from a state where both the first door 110-2 and the second door 110-1 are closed, the rotating bar 10 may be folded in a direction towards the inside of the refrigerator from the horizontal direction of the second door 110-1 due to a mechanical interference of a structure or the first door 110-2 included in the main body 110. In other words, when both the first door 110-2 and the second door 110-1 are closed, it is necessary to overcome the mechanical interference of the structure or the first door 110-2 included in the main body 110, in order to open the second door, to which the rotating bar is attached, first, and accordingly, a load of the second motor may increase. Therefore, the processor 140 may drive the first motor in order to open the first door 110-2 first, and then drive the second motor in order to open the second door 110-1, to which the rotating bar 10 is attached, thereby reducing the load of the second motor.

If each of the first door 110-2 and the second door 110-1 is opened by a threshold angle, the processor 140 may control revolutions per minute (RPM) of each of the first motor and the second motor so that the opening operations of the first door 110-2 and the second door 110-1 are completed at the same time. Specifically, the processor 140 may identify whether the first door 110-2 and the second door 110-1 are opened by the threshold angle by using a door position sensor for detecting an opening angle by which the door is rotated. Meanwhile, the completion of the opening operation of the door may imply that the door is opened by 90 degrees. However, this is merely an embodiment, and the angle of the door to be identified as that the opening operation is completed may be changed by the user. In addition, the threshold angle may be a predetermined angle less than 90 degrees and may also be changed by the user.

Specifically, if it is identified that each of the first door 110-2 and the second door 110-1 is opened by the threshold angle, the processor 140 may control the revolutions per minute (RPM) of each of the first motor and the second motor so that the opening operations of the first door 110-2 and the second door 110-1 are completed at the same time or within a threshold error range. As the RPM value of the motor increases, the magnitude of the rotational force generated by the motor increases, and therefore, an opening or closing speed of the door corresponding to the motor may increase. In addition, as a weight of the door increases, the motor may generate a greater rotational force in order to maintain the opening or closing speed of the door.

Accordingly, the processor 140 may control the RPM of the first motor and the second motor based on at least one of the weight of each of the first door 110-2 and the second door 110-1 and the time point when each door is opened by the threshold angle.

Specifically, the processor 140 may identify the weight of each of the first door 110-2 and the second door 110-1 by using a sensor for detecting the weight of the door. The weight of the first door 110-2 and the second door 110-1 may change depending on objects included in a cabinet attached thereto. If it is identified that the weight of the first door 110-2 is greater than the weight of the second door 110-1, the processor 140 may determine the RPM of the first motor corresponding to the first door 110-2 as a value greater than the RPM of the second motor corresponding to the second door 110-1, and perform the control so that the opening operations of the first door 110-2 and the second door 110-1 are completed at the same time or within the threshold error range.

In addition, the time point when each of the first door 110-2 and the second door 110-1 is opened by the threshold angle may change. The processor 140 drives the first motor first in order to open the first door 110-2 first, but the second door 110-1 may be open first by a threshold angle, because the first door 110-2 is heavier than the second door 110-1. In this case, the processor 140 may determine the RPM of the first motor corresponding to the first door 110-2 as a value greater than the RPM of the second motor corresponding to the second door 110-1, and perform the control so that the opening operations of the first door 110-2 and the second door 110-1 are completed at the same time or within the threshold error range.

Meanwhile, when a first threshold time elapses after the opening operations of the first door 110-2 and the second door 110-1 are completed, the processor 140 may start driving the second motor in order to close the second door 110-1. However, although the door opening operations are completed and the threshold time elapses, if it is identified that the user is close to the refrigerator 100, the processor 140 may not perform the closing operation of the second door 110-1.

When the processor 140 starts driving the second motor in order to close the second door, the counter electromotive force may be generated on the second motor and the magnitude of the inrush current flowing to the second motor may increase. When the first motor and the second motor start being driven at the same time, the refrigerator 100 may need a large capacity of power device for overcoming the counter electromotive force and inrush current generated on the first motor and the second motor. Accordingly, after a second time elapses from the time when the second motor is started being driven, the processor 140 may start driving the first motor in order to close the first door 110-2.

Meanwhile, the second time may be a time after the counter electromotive force is generated on the second motor by starting the driving of the second motor, and before the magnitude of the inrush current flowing to the second motor increases. The refrigerator 100 may store information regarding the second time. Accordingly, the refrigerator 100 may start driving the first motor after the second time from the time when the second motor is started being driven based on the pre-stored information regarding the second time.

In addition, the time point when the inrush current flowing to the first motor increases may be a time point when the magnitude of the inrush current flowing to the second motor is decreased and maintained as the magnitude of the rated current. Accordingly, the refrigerator 100 may include a power device for overcoming the rated current flowing to the second motor and the counter electromotive force and inrush current generated on the first motor. The capacity of the power device necessary for overcoming the rated current flowing to the second motor and the counter electromotive force and inrush current generated on the first motor may be much smaller than the capacity of the power device necessary for driving the first motor and the second motor at the same time.

In another embodiment of the disclosure, the second time may be a time during which the magnitude of the inrush current applied to the second motor by starting driving the second motor becomes a value less than a threshold value. Specifically, the refrigerator 100 may identify the magnitude of the inrush current flowing to the second motor via a sensor for detecting a magnitude of a current. If it is identified that the magnitude of the inrush current applied to the second motor is a value less than the threshold value, the refrigerator 100 may start driving the first motor. A time point when the first motor is started being driven and the magnitude of the inrush current flowing to the first motor increases may overlap with a time point when the rated current is flowing to the second motor. Accordingly, the refrigerator 100 may drive the motors for automatically opening the doors even with a power device with a small capacity.

Meanwhile, referring to the part (c) of FIG. 1C, in a state where both the first door 110-2 and the second door 110-1 are opened, the rotating bar 10 of the second door 110-1 may be spread in the horizontal direction of the second door 110-1 from a direction towards the inside of the refrigerator 100 by a user or due to other mechanical interference. If the first door 110-2 is closed first while the rotating bar 10 is spread in the horizontal direction of the second door 110-1, although the processor 140 drives the second motor in order to close the second door 110-1, the second door 110-1 may not be completely closed, because the rotating bar is blocked by the first door 110-2. If the rotating bar is blocked by the first door and the second door is not completely closed, the processor 140 may drive the first motor so as to open the first door 110-2 again.

After a second threshold time from the time when the first door is opened, the processor 140 may drive the first motor and the second motor so as to close the second door 110-1 first and then close the first door 110-2. Specifically, the processor 140 may start driving the second motor so that the second door 110-1 is closed first, after the second threshold time from the time when the first door 110-2 is opened. Then, when the second door 110-1 is completely closed or closed by a predetermined angle, the processor 140 may drive the first motor so that the first door 110-2 is closed.

Meanwhile, the processor 140 may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 140 may be implemented as System on Chip (SoC) or large scale integration (LSI) including the processing algorithm or may be implemented in form of a field programmable gate array (FPGA). The processor 140 may perform various functions by executing computer executable instructions stored in the memory 180. In addition, the processor 140 may include at least one of a graphics-processing unit (GPU), a neural processing unit (NPU), and a visual processing unit (VPU), in order to perform an artificial intelligence function.

The outputter 150 is a configuration of outputting various information and messages and may include circuitry. For example, the outputter 150 may include a display, a speaker, a light emitting diode (LED). If the outputter 150 is implemented as a display, the display may display a message indicating that the door is not completely closed. If the outputter 150 is implemented as a speaker, the speaker may output a message indicating that the operation of opening the door is started or a message indicating that the door is not completely closed as a voice. Meanwhile, the speaker may output not only various pieces of audio data obtained by executing various processing such as decoding, amplification, or noise filtering by an audio processor (not illustrated), but also various alerts or voice messages.

The communicator 160 may include at least one circuitry to communicate with an external device. The communication connection of the communicator 160 with the external device may include communication via a third device (e.g., a repeater, a hub, an access point, a server, a gateway, or the like).

The communicator 160 may include various types of wireless communication modules. For example, the communicator 160 may include at least one of a Wi-Fi module, a Bluetooth communication module, a cellular communication module, a long term evolution (LTE) communication module, and a 5G communication module. In particular, the communicator 160 may receive a user command for opening the door which is received from a user terminal device (e.g., smartphone, table PC, a wearable device, and the like). In addition, when a user voice command is obtained via a microphone, the communicator 160 may transmit the obtained voice command to an external server. The external server may include a dialogue system which is an artificial intelligence model capable of outputting a response to the input voice. The communicator 160 may receive a signal including the command for opening the door from the external server.

The sensor 170 may detect various pieces of state information of the refrigerator 100. For example, the sensor 170 may include a current detection sensor for detecting information regarding a current flowing to each motor (e.g., direction, magnitude, and the like of the current). In another example, the sensor 170 may include a weight detection sensor for detecting a weight of the door. In still another example, the sensor 170 may include a door position sensor for detecting a position of the door or an angle of the door opened (or rotation angle). The door position sensor may be disposed at a position where it is easy to detect the position or the rotation angle of the door. For example, the door position sensor is disposed in a lower region of the door, but this is merely an embodiment, and the door position sensor may be disposed in an upper region of the door or in a center region of the refrigerator 100.

In still another example, the sensor 170 may include a rotation speed sensor for detecting a speed of rotation of the motor. In still another example, the sensor 170 may include a touch sensor for detecting a user touch or may include a proximity sensor for detecting whether an object approaches. In still another example, the sensor 170 may include a pressure sensor for detecting a physical interaction.

The memory 180 may store instructions or data related to at least another constituent element of the refrigerator 100. In particular, the memory 180 may be implemented as a non-volatile memory, a volatile memory, a flash memory, a hard disk drive (HDD), or a solid state drive (SSD). The memory 180 may be accessed by the processor 140 and reading, recording, editing, deleting, or updating of the data by the processor 140 may be executed. A term, memory, in the disclosure may include the memory 180, a ROM (not illustrated) and RAM (not illustrated) in the processor 140, or a memory card (not illustrated) (e.g., micro secure digital (SD) card or memory stick) mounted on the refrigerator 100. In addition, the memory 180 may store programs and data for configuring various screens to be displayed in a display area of the display.

Figure 2A:
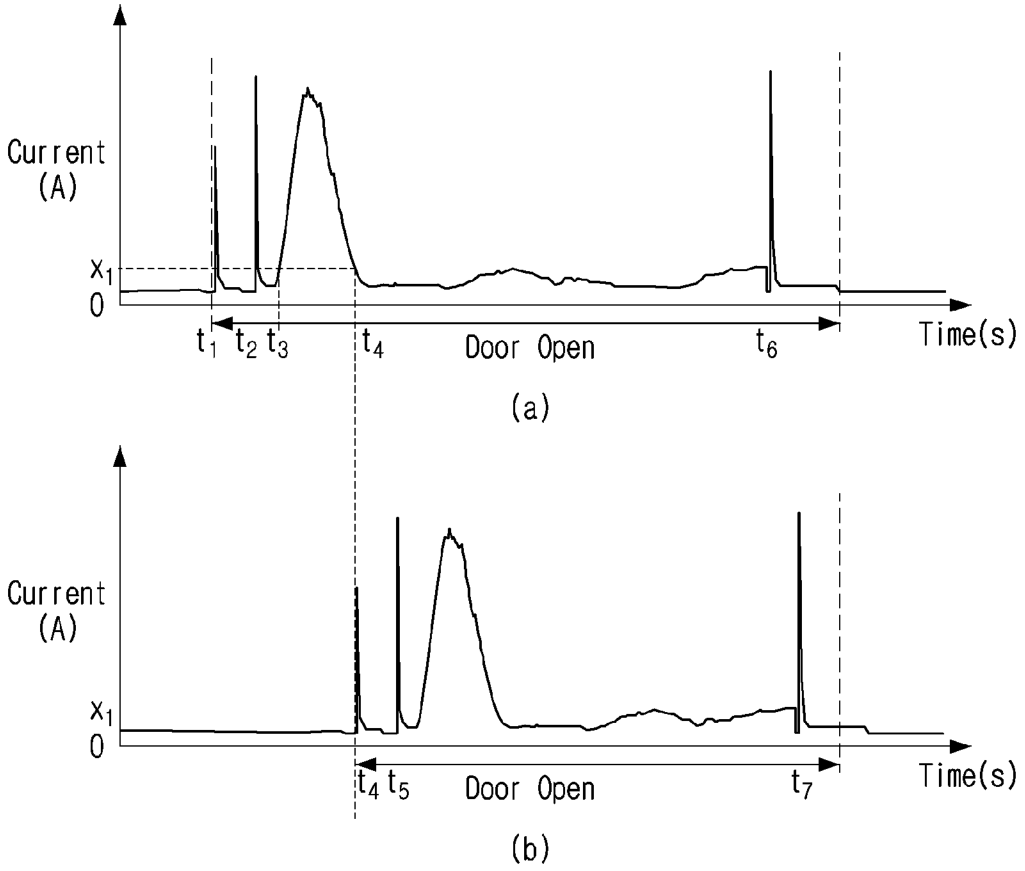
FIG. 2A is graphs describing currents flowing to first and second motors in order to open first and second doors according to an embodiment of the disclosure.

FIG. 2A is graphs describing currents flowing to first and second motors over time in order to open first and second doors of a refrigerator according to an embodiment of the disclosure. The part (a) of FIG. 2A is a current-time graph showing a magnitude of a current flowing to the first motor over time, and the part (b) of FIG. 2A is a current-time graph showing a magnitude of a current flowing to the second motor over time.

Figure 2B:
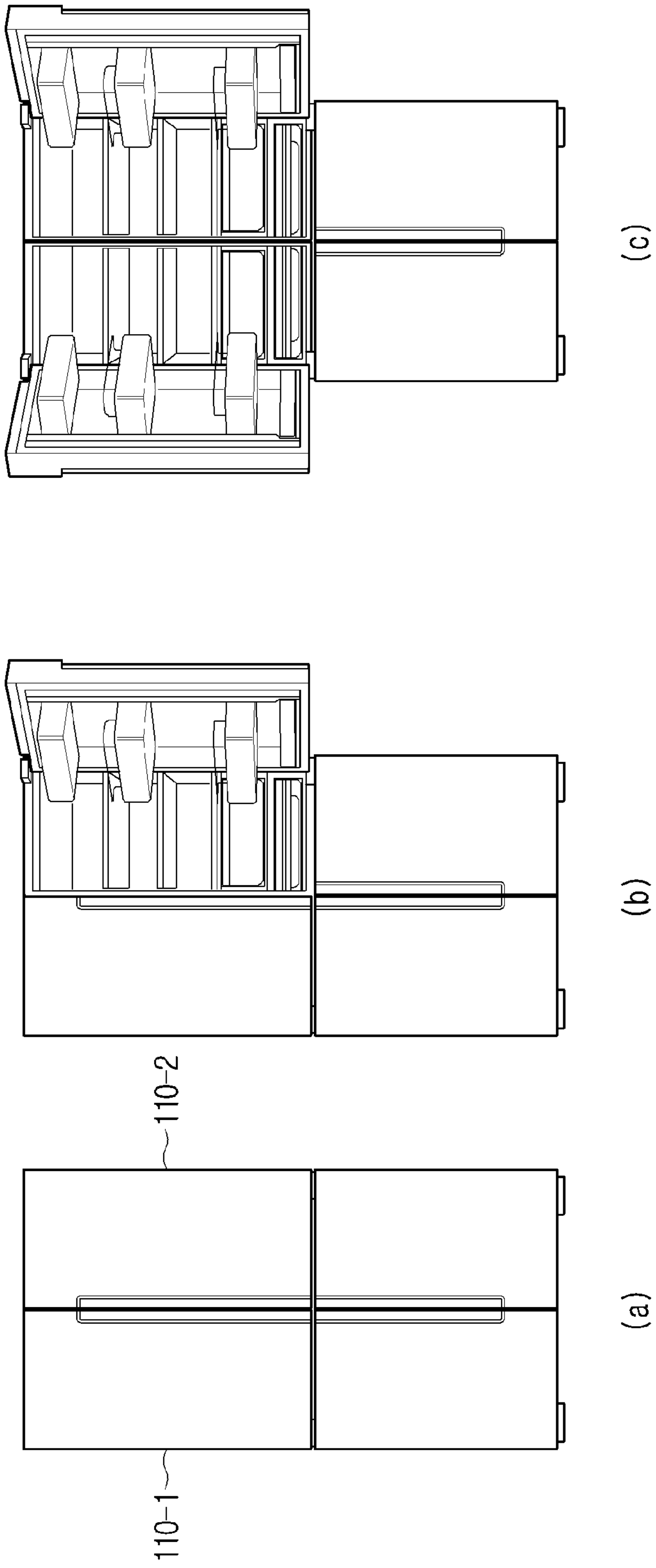
FIG. 2B is a diagram illustrating an operation of opening doors of a refrigerator according to an embodiment of the disclosure.

FIG. 2B is a diagram illustrating an operation of opening doors of a refrigerator according to an embodiment of the disclosure. The operation that the door of the refrigerator 100 is opened in FIG. 2B will be described in relation to the graphs of FIG. 2A.

Referring to FIGS. 2A and 2B, from 0 second to t1 seconds, the first door 110-2 and the second door 110-1 of the refrigerator 100 may be closed as illustrated in the part (a) of FIG. 2B. If a user command for opening the door is obtained at t1 seconds, the refrigerator 100 may start driving the first motor in order to open the first door. Specifically, if a power is input to the first motor in order to obtain the user command at t1 seconds, a counter electromotive force may be generated on the first motor at least once or more within t2 seconds. The counter electromotive force generated on the first motor may be in an opposite direction of a voltage input to the first motor. In addition, a magnitude of inrush current flowing to the first motor may increase from t3 seconds.

The refrigerator 100 may start driving the second motor at a time t4 when the magnitude of the inrush current applied to the first motor is a value less than a threshold value x1. In other words, at the time point t4, the refrigerator 100 may supply a power to the second motor. With the supply of the power, the counter electromotive force may be generated on the second motor and the magnitude of inrush current may increase. Meanwhile, an operating current with a magnitude smaller than the inrush current may flow to the first motor from the time point t4 until the door is opened by a threshold angle. Accordingly, the time point when the counter electromotive force is generated on the second motor and the magnitude of the inrush current increases may be the time point when the operating current flows to the first motor. Referring to the part (b) of FIG. 2B, the refrigerator 100 may start the operation of the second motor in order to open the second door 110-1, after opening the first door 110-2 first.

In addition, if each of the first door and the second door is opened by the threshold angle, the refrigerator 100 may control the RPM of each of the first motor and the second motor so that the opening operations of the first door and the second door are completed at the same time or within the threshold error range. Specifically, the refrigerator 100 may control the RPM of the first motor and the second motor based on at least one of the weight of each of the first door and the second door and the time point when the door is opened by the threshold angle. Accordingly, referring to the parts (a) and (b) of FIG. 2A, a time point t6 when the opening of the first door is completed and a time point t7 when the opening of the second door is completed may be within the threshold error range.

Meanwhile, if the opening of each of the first door and the second door is completed, the power is no longer supplied to the first motor and the second motor, and accordingly, the counter electromotive force may be generated due to a change of the current of the coil included in each of the first motor and the second motor. Accordingly, it is illustrated that the magnitude of the current increases due to the counter electromotive force generated in the vicinity of t6 and t7 of the graph of each of the parts (a) and (b) of FIG. 2A.

Figure 3A:
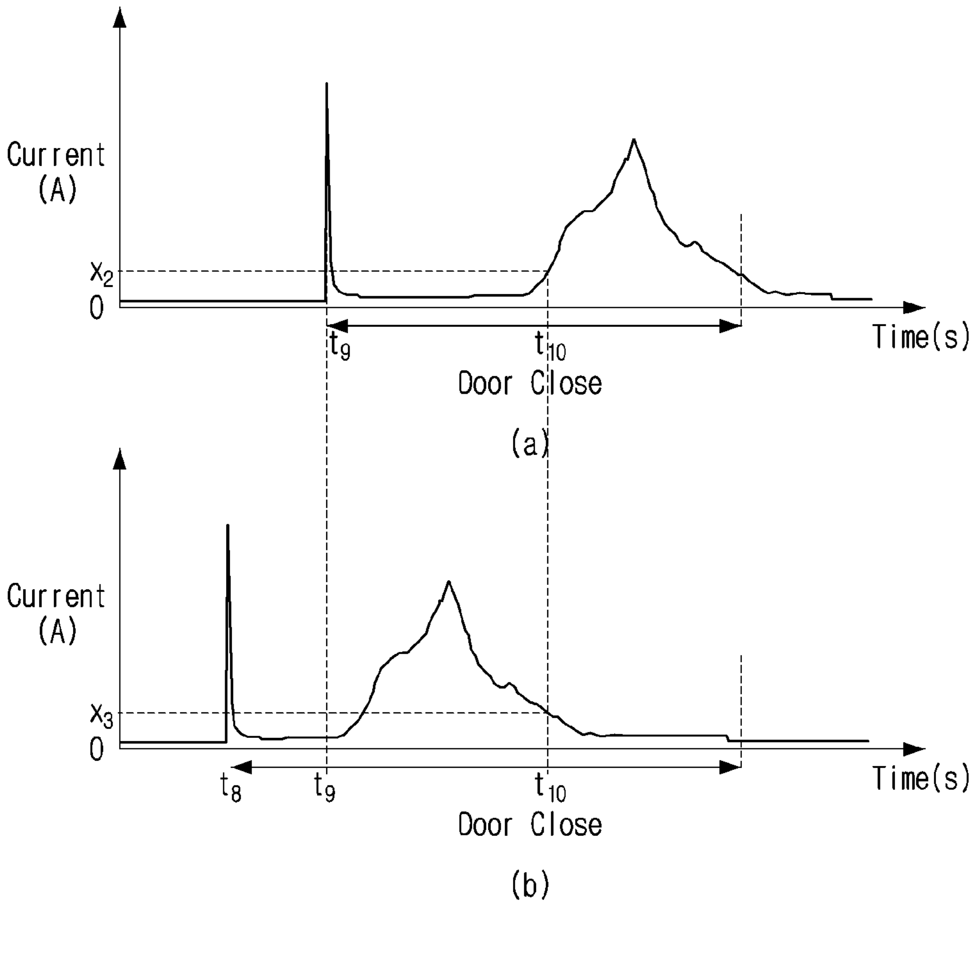
FIG. 3A is graphs describing currents applied to motors when first and second doors of a refrigerator are closed according to an embodiment of the disclosure.

FIG. 3A is graphs describing currents flowing to first and second motors, respectively, in order to close first and second doors of a refrigerator according to an embodiment of the disclosure.

Referring to FIG. 3A, in part (a) is a current-time graph showing a magnitude of a current flowing to the first motor over time, and part (b) is a current-time graph showing a magnitude of a current flowing to the second motor over time.

Figure 3B:
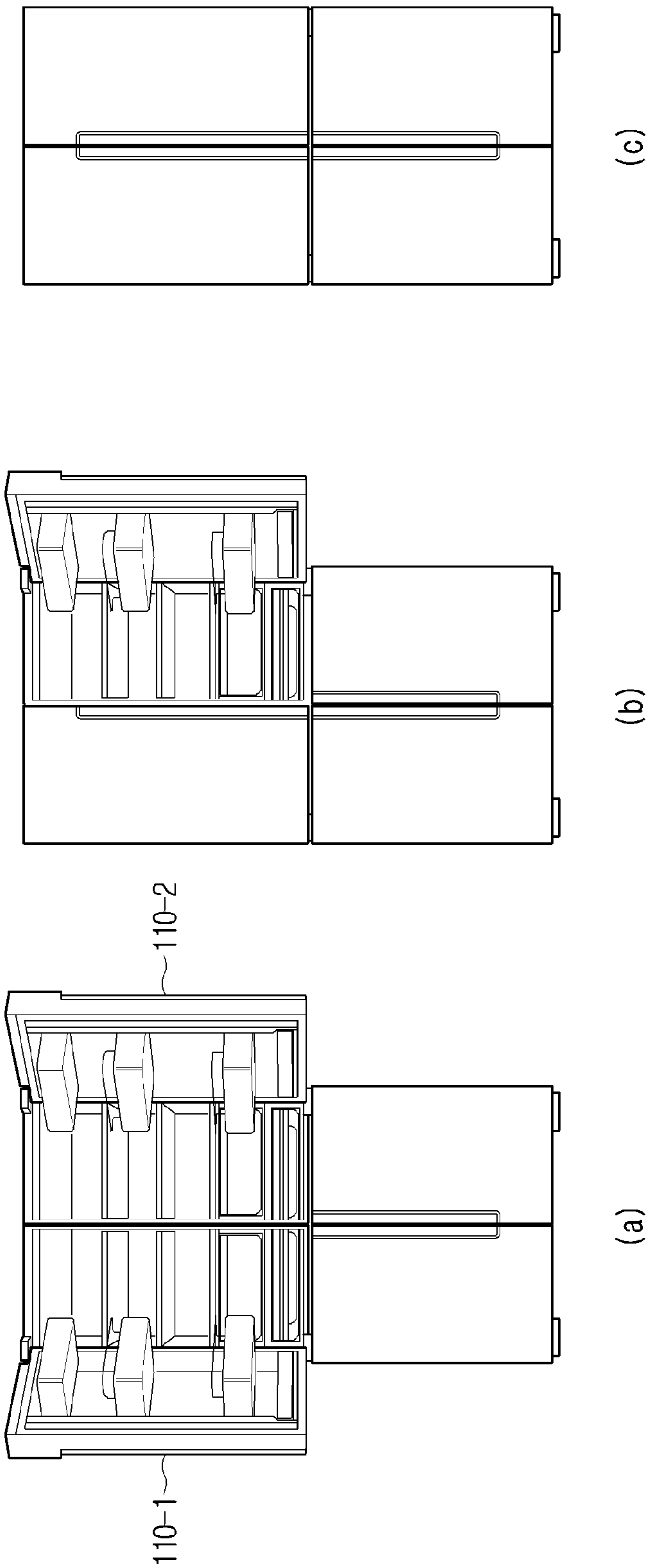
FIG. 3B is a diagram illustrating an operation of closing doors of a refrigerator according to an embodiment of the disclosure.

FIG. 3B is a diagram illustrating an operation of closing doors of a refrigerator according to an embodiment of the disclosure. The operation that the door of the refrigerator 100 is closed in FIG. 3B will be described in relation to the graphs of FIG. 3A.

Referring to FIG. 3B, in part (a), when the first threshold time elapses after the operation of opening the first door 110-2 and the second door 110-1 is completed, the refrigerator 100 may start driving the second motor in order to close the second door 110-1. For example, referring to the part (b) of FIG. 2A, the refrigerator 100 may start driving the second motor at the time point t8, when the first threshold time has elapsed from the time point t7 when the second door 110-1 is opened. However, this is merely an embodiment, and although the first threshold time elapses after the first door 110-2 and the second door 110-1 are opened, if it is identified that the user is close to the refrigerator 100, the refrigerator 100 may not perform the operation of closing the second door.

Referring to the part (b) of FIG. 3A, when the driving of the second motor is started and the power is input to the second motor, the counter electromotive force may be generated on the second motor.

After the second time from the time when the second motor is started being driven, the refrigerator 100 may start driving the first motor, in order to close the first door 110-2. The second time may be a time after the counter electromotive force is generated on the second motor by starting the driving of the second motor, and before the magnitude of the inrush current flowing to the second motor increases. For example, referring to the part (a) of FIG. 3A, the refrigerator 100 may start driving the first motor in order to close the first door 110-2 before the magnitude of the inrush current increases (t9) after a time point t8 when the driving of the second motor is started. Accordingly, a time point t10 when the magnitude of the inrush current flowing to the first motor increases may be a time point when the magnitude of the inrush current flowing to the second motor decreases and becomes a magnitude of the rated current. In addition, referring to the part (c) of FIG. 3B, both doors of the refrigerator 100 may be closed when the first door 110-2 is closed.

Meanwhile, the refrigerator 100 may store information regarding the second time which is the time after the counter electromotive force is generated on the second motor and before the magnitude of the inrush current flowing to the second motor increases. Accordingly, the refrigerator 100 may start driving the second motor and then start driving the first motor after the second time, based on the pre-stored information regarding the second time. Referring to the part (b) of FIG. 3B, the refrigerator 100 may drive the second motor first to close the second door 110-1 and then drive the first motor in order to close the first door 110-2.

In another embodiment of the disclosure, when the magnitude of the inrush current applied to the second motor by starting the driving of the second motor becomes a value less than the threshold value, the refrigerator 100 may start driving the first motor in order to close the first door. Specifically, the refrigerator 100 may start driving the second motor and identify the magnitude of the current flowing to the second motor via a sensor. If it is identified that the magnitude of the inrush current flowing to the second motor increases and becomes a value less than the threshold value, the refrigerator 100 may start driving the first motor. Accordingly, the time point when the counter electromotive force is generated and the inrush current is generated on the first motor is the time point when the rated current flows to the second motor, and accordingly, it is not necessary to provide a power device with a large capacity in the refrigerator 100.

Figure 4:
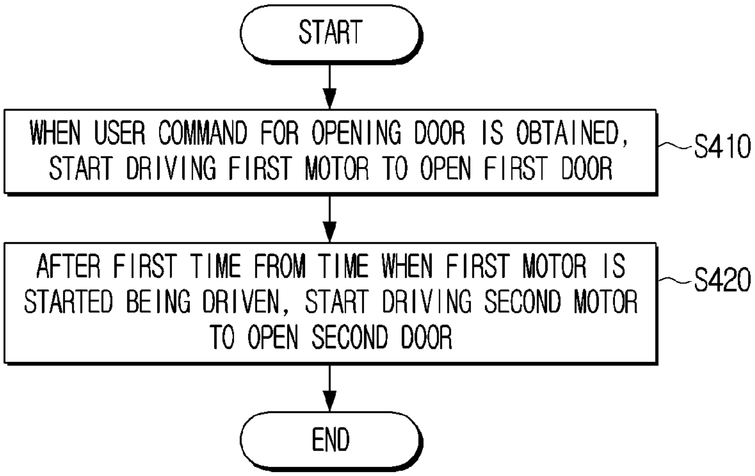
FIG. 4 is a flowchart illustrating a method for controlling a refrigerator according to an embodiment of the disclosure.

FIG. 4 is a flowchart illustrating a method for controlling a refrigerator according to an embodiment of the disclosure.

Referring to FIG. 4, first, when a user command for opening the door is obtained, the refrigerator 100 may start driving the first motor in order to open the first door at operation 5410.

After the first time from the time when the first motor is started being driven, the refrigerator 100 may start driving the second motor in order to open the second door at operation 5420. The first time may be a time during which the magnitude of the inrush current applied to the first motor by starting driving the first motor becomes a value less than a threshold value. The time point when the magnitude of the inrush current flowing to the second motor increases by applying the power to the second motor may be the time point when the operating current with the magnitude smaller than the inrush current flows to the first motor. In other words, the refrigerator 100 may drive the first motor with the operating current with the magnitude smaller than the inrush current, until the first door is opened by the threshold angle, after the first time from the time the first motor is started being driven. Meanwhile, the rotating bar may be combined with the second door.

When the first door and the second door are opened by the threshold value, the refrigerator 100 may control the RPM of the first motor and the second motor so that the opening operations of the first door and the second door are completed at the same time. Specifically, the refrigerator 100 may control the RPM of the first motor and the second motor based on at least one of the weight of each of the first door and the second door and the time point when the door is opened by the threshold angle.

Meanwhile, when the first threshold time elapses from the time when the operation of opening the first door and the second door is completed, the refrigerator 100 may start driving the second motor in order to close the second door. After the second time from the time when the second motor is started being driven, the refrigerator 100 may start driving the first motor in order to close the first door. The second time may be a time after the counter electromotive force is generated by starting the driving of the second motor, and before the magnitude of the inrush current flowing to the second motor increases. In another example, the second time may be a time during which the magnitude of the current flowing to the second motor by starting driving the second motor becomes less than a threshold value.

The embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may perform one or more functions and operations described in this specification.

Computer instructions for executing processing operations according to the embodiments of the disclosure descried above may be stored in a non-transitory computer-readable medium. When the computer instructions stored in such a non-transitory computer-readable medium are executed by the processor, the computer instructions may enable a specific machine to execute the processing operations according to the embodiments described above.

The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

The machine-readable storage medium may be provided in a form of a non-transitory storage medium. Here, the "non-transitory" storage medium is tangible and may not include signals, and it does not distinguish that data is semi-permanently or temporarily stored in the storage medium. For example, the "non-transitory storage medium" may include a buffer temporarily storing data.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online (e.g., downloading or uploading) through an application store (e.g., PlayStore™) or directly between two user devices (e.g., smartphones). In a case of the on-line distribution, at least a part of the computer program product may be at least temporarily stored or temporarily generated in a machine-readable storage medium such as a memory of a server of a manufacturer, a server of an application store, or a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A refrigerator comprising:

a main body;

a first door and a second door coupled to the main body;

a rotating bar rotatably combined with the second door for preventing refrigerated air in the refrigerator from leaking through a gap between the first door and the second door;

a first motor for opening the first door and a second motor for opening the second door;

memory storing one or more computer programs; and one or more processors communicatively coupled to the first motor, the second motor, and the memory, wherein the one or more computer programs include computer-executable instructions that, when executed by the one or more processors, cause the refrigerator to:

based on a user command for opening the first door and the second door being obtained, start driving the first motor to open the first door, and after a first time from a time when the first motor has started being driven, start driving the second motor to open the second door, and wherein the one or more computer programs further include computer-executable instructions that, when executed by the one or more processors, cause the refrigerator to:

start driving the second motor to close the second door, and start driving the first motor to close the first door, after a second time from the time when the second motor has started being driven.

2. The refrigerator according to claim 1, wherein the first time is a time during which a magnitude of an inrush current applied to the first motor by starting the driving of the first motor becomes a value less than a threshold value.

3. The refrigerator according to claim 2, wherein the one or more computer programs further include computer-executable instructions that, when executed by the one or more processors, cause the refrigerator to drive the first motor with an operating current with a magnitude smaller than the inrush current applied to the first motor, until the first door is opened by a threshold angle after the first time.

4. The refrigerator according to claim 1, wherein the second time is a time after a counter electromotive force is generated on the second motor by starting the driving of the second motor, and before a magnitude of an inrush current flowing to the second motor increases.

5. The refrigerator according to claim 1, wherein the one or more computer programs further include computer-executable instructions that, when executed by the one or more processors, cause the refrigerator to, based on the first door and the second door being opened by a threshold angle, control revolutions per minute (RPM) of the first motor and the second motor so that opening operations of the first door and the second door are completed at the same time.

6. The refrigerator according to claim 5, wherein the one or more computer programs further include computer-executable instructions that, when executed by the one or more processors, cause the refrigerator to control the RPM of the first motor and the second motor based on at least one of a weight of each of the first door and the second door and a time point when each of the first door and the second door is opened by the threshold angle.

7. The refrigerator according to claim 1, wherein the one or more computer programs further include computer-executable instructions that, when executed by the one or more processors, cause the refrigerator to:

based on the second door not being closed due to the rotating bar after the first door is closed first, drive the first motor to open the first door, and after a second threshold time from the time when the first door is opened, drive the first motor and the second motor so that the second door is closed first and then the first door is closed.

8. A method performed by a refrigerator comprising a main body, a first door and a second door coupled to the main body, a rotating bar rotatably combined with the second door for preventing refrigerated air in the refrigerator from leaking through a gap between the first door and the second door, a first motor for opening the first door, a second motor for opening the second door and one or more processors, the method comprising:

based on a user command for opening the first door and the second door being obtained, starting, by the refrigerator, driving the first motor to open the first door; and after a first time from a time when the first motor has started being driven, starting, by the refrigerator, driving the second motor to open the second door, wherein the method further comprises:

starting driving the second motor to close the second door; and starting driving the first motor to close the first door, after a second time from the time when the second motor has started being driven.

9. The method according to claim 8, wherein the first time is a time during which a magnitude of an inrush current applied to the first motor by starting the driving of the first motor becomes a value less than a threshold value.

10. The method according to claim 9, wherein the starting driving of the second motor comprises driving the first motor with an operating current with a magnitude smaller than the inrush current applied to the first motor, until the first door is opened by a threshold angle after the first time.

11. The method according to claim 8, wherein the second time is a time after a counter electromotive force is generated on the second motor by starting the driving of the second motor, and before a magnitude of an inrush current flowing to the second motor increases.

12. The method according to claim 8, further comprising:

based on the first door and the second door being opened by a threshold angle, controlling revolutions per minute (RPM) of the first motor and the second motor so that opening operations of the first door and the second door are completed at the same time.

13. The method according to claim 12, wherein the controlling of the RPM of the first motor and the second motor comprises controlling the RPM of the first motor and the second motor based on at least one of a weight of each of the first door and the second door and a time point when each of the first door and the second door is opened by the threshold angle.

14. The method according to claim 8, further comprising:

based on the second door not being closed due to the rotating bar after the first door is closed first, driving the first motor to open the first door; and after a second threshold time from the time when the first door is opened, driving the first motor and the second motor so that the second door is closed first and then the first door is closed.

* * * * *